(12) United States Patent
Gagliano et al.

(10) Patent No.: US 7,385,743 B2
(45) Date of Patent: Jun. 10, 2008

(54) LINEAR IMAGER RESCALING METHOD

(75) Inventors: Jeffrey A. Gagliano, East Greenville, PA (US); Han Zhang, Hatfield, PA (US); Richard J. Skokowski, Jr., Warminster, PA (US); Kurt Hecht, Buckingham, PA (US)

(73) Assignee: Accu-Sort Systems, Inc., Hatfield, PA (US)

( * ) Notice: Subject to any disclaimer, the term of this patent is extended or adjusted under 35 U.S.C. 154(b) by 351 days.

(21) Appl. No.: 10/493,048

(22) PCT Filed: Oct. 16, 2002

(86) PCT No.: PCT/US02/32951
§ 371 (c)(1),
(2), (4) Date: Oct. 27, 2004

(87) PCT Pub. No.: WO03/044586
PCT Pub. Date: May 30, 2003

(65) Prior Publication Data
US 2005/0036185 A1    Feb. 17, 2005

Related U.S. Application Data

(60) Provisional application No. 60/330,045, filed on Oct. 16, 2001.

(51) Int. Cl.
*G02B 26/08* (2006.01)
(52) U.S. Cl. .................................................. 359/196
(58) Field of Classification Search ......... 359/196–226
See application file for complete search history.

(56) References Cited

U.S. PATENT DOCUMENTS

| 5,115,121 A | 5/1992 | Bianco et al. |
| 5,616,909 A | 4/1997 | Arackellian |

(Continued)

FOREIGN PATENT DOCUMENTS

DE          198 51 284        5/2000

(Continued)

OTHER PUBLICATIONS

Tobias W. Kellenberger, Remote Sensing Series vol. 28, 1996.
Anko Börner Dissertation University of Berlin, Development and Test of Onboard Algorithms for Land Remote Sensing, 1999.

(Continued)

*Primary Examiner*—Euncha P Cherry
(74) *Attorney, Agent, or Firm*—Nelson Mullins Riley & Scarborough, LLP

(57) ABSTRACT

A system and method for removing perspective distortion from an image of an object (112) moving along a transport device (114) having a top surface (124) is disclosed. A line scanner (110) to create a first image of an object. The first image is composed of a plurality of scan lines, each having a resolution. Each of the scan lines is then rescaled, so that the resolution of each scan line is equal to the resolution of every other scan line. Each of the scan lines is processed in two halves so that the center lines of the scan lines are co-linear after rescaling. The line scanner is optionally configured to vary its field of view as a function of the distance between the line scanner and the portion of the object being scanned.

16 Claims, 5 Drawing Sheets

U.S. PATENT DOCUMENTS 6,271,520 B1    8/2001    Tao et al.

FOREIGN PATENT DOCUMENTS

| | | |
|---|---|---|
| EP | 0 698 991 | 9/1996 |
| EP | 0 833 270 | 4/1998 |

OTHER PUBLICATIONS

Hecht, Eugene; "Optics", 1989, Addison-Wesley Publishing Co., Reading, MA pp. 142-143.

Response to Examiner's Report dated Jun. 8, 2007 regarding EPC Application No. 02780468.1 entitled "Linear Imager Rescaling Method," 15 pgs.

Examiner's Report dated Jun. 8, 2007 regarding EPC Application No. 02780468.1 entitled "Linear Imager Rescaling Method," 3 pgs.

LINEAR IMAGER RESCALING METHOD

CROSS REFERENCE TO RELATED APPLICATION

This application claims the benefit of U.S. Provisional Patent Application No. 60/330,045, filed on Oct. 16, 2001, which is hereby incorporated by reference as if fully set forth.

BACKGROUND

The invention generally relates to an improved method for removing perspective distortion from digital images in optical scanning applications, such as bar code scanning or optical character recognition (hereinafter "OCR") systems.

CCD cameras and other imaging equipment are commonly used in industry as part of identification systems which image and interpret bar code or character information on products and packages as well as product dimensioning systems.

Referring to the drawings, wherein like numerals designate like elements throughout, FIG. 1 illustrates one such application. An optical scanning apparatus 1 which comprises a line scanner 10 (i.e., an electronic imaging device that scans images of 1×N pixels) which is configured to image a box 12 as it proceeds along a conveyor belt 14 having a top surface 24 in a leftward direction of travel 16. As the box 12 moves along the conveyor belt 14, the imager 10 takes a series of images along a linear scan line 18 which are electronically compiled into a resultant image 26 (shown in FIG. 2).

By way of further illustration, FIG. 2 shows an example of a resultant image 26 of the box 12 taken with the line scanner 10. As is evident from FIG. 2 the upper front edge 22 of the box 12 appears larger than the lower front edge 20. As can be seen in FIG. 2, the resultant image 26 is distorted in the sense that the portions of the box 12 which are further away from the line scanner 10 appear smaller than the portions of the box 12 which are closer to the sensor 10. This effect is illustrated by the different widths of the lower front edge 20 and upper front edge 22 of the box 12. The width of the upper and lower edges 20 and 22 are, in fact, equal.

Perspective distortion presents a problem in bar code, OCR, and other identification applications because such distortion can have a detrimental effect on the ability to accurately read the bar codes and/or characters which are to be identified.

Referring again to FIG. 1, previous attempts to rescale images captured by the imager 10 to eliminate perspective distortion have involved the use of a zoom lens in combination with dimensioning device (not shown), which dynamically measures the distance D1 between the imager 10 and the point 30 on the box 12, which is intersected by the scan line 18 of the imager 10. The zoom lens is adjusted before each scan line is taken, which compensates for perspective distortion as the box 12 moves along conveyor belt 14. The zoom lens rescaling method is not ideal because it requires constant movement of a mechanical component, the zoom lens, which limits the scan rate of the camera and potentially reduces the reliability and useful life of the camera.

SUMMARY OF THE INVENTION

The invention comprises a method for correcting an image of an object moving along a transport device having a top surface. At least a portion of the object is scanned using a line scanner to create a first image. The first image is composed of a plurality of scan lines, each having a resolution that varies as a function of the distance between the object and the line scanner. Each of the scan lines is then rescaled, so that the resolution of each scan line is equal to the resolution of every other scan line.

In another respect, the invention comprises a method for correcting an image of an object moving along a transport device having a top surface. The image is captured by an imaging device including a lens having a focal length and a field of view. The distance between the lens and a first portion of the object at a first point in time is determined. The distance information is used to adjust the focal length of the imaging device as a function of the height of the first portion of the object. Then the first portion is scanned at the first point in time to create a scan line comprising an array of pixels and having a resolution that varies as a function of the distance between the object and the imaging device. The scan line is then rescaled so that the resolution is equal to a target resolution.

In yet another respect, the invention comprises a system for capturing perspective-corrected images of an object moving along a transport device. The system includes a line scanner having a focal length and a field of view. The line scanner captures scan lines, each having a resolution that varies as a function of the distance between the object and the line scanner. A target resolution is determined and is less than or equal to the lowest resolution of any of the scan lines. A controller is provided that rescales each of the scan lines so that the resolution of each of the scan lines is equal to the target resolution.

BRIEF DESCRIPTION OF THE DRAWING(S)

DETAILED DESCRIPTION OF THE PREFERRED EMBODIMENTS

Figure 3:
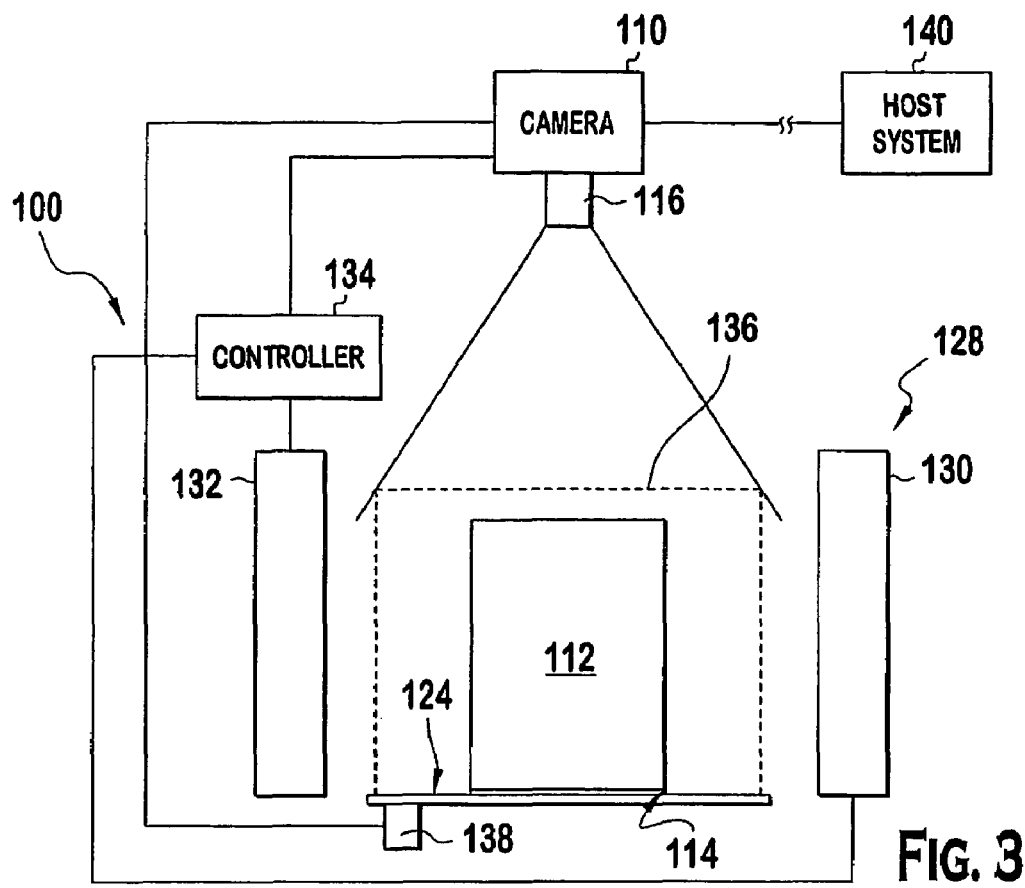
FIG. 3 is a schematic drawing showing a front view of an identification system in accordance with the present invention.

Referring to FIG. 3, a preferred embodiment of the scanning identification system 100 of the present invention is shown. The system 100 preferably includes a line-scan camera 110 (hereinafter "camera 110") which is in communication with a height-measuring device 128, a speed-measuring device 138, and a host system 140. The system 100 also includes a conveyor 114 having a top surface 124. The conveyor could, of course, comprise any transport device suitable for transporting objects (boxes, packages, etc.) past the camera 110, such as a moving belt, rollers, and the like.

In FIG. 3, a box 112 is shown on the top surface 124 of the conveyor 114 and is moving in a direction of travel coming straight out of the page. The camera 110 takes a series of line scans as the box moves through the sight line of the camera 110 for the purpose of identifying bar code, textual, and/or other optical information on the outer surface of the box 112.

Figure 1:
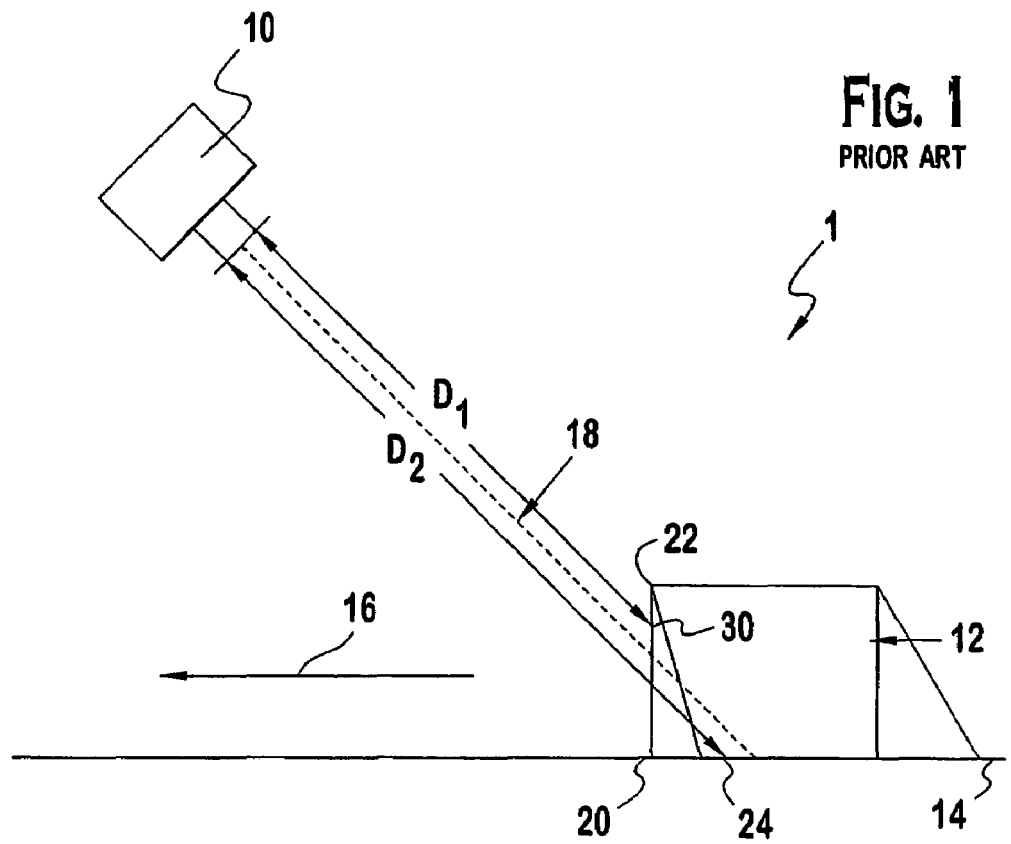
FIG. 1 is a schematic drawing showing a side view of a conventional identification system including a line scanner and a box moving along a conveyor belt.

The camera 110 preferably includes an auto-focus lens system 116 that enables camera to focus on any portion of the box that in the sight line that is with an object imaging zone 136. In order to properly focus the lens system 116 (i.e., adjust its focal length), it is necessary to determine the distance between the nodal plane of the lens system 116 and the portion of the box 112 being scanned (see distance D1 of FIG. 1). This distance can be calculated by providing the camera 110 information regarding the height of the portion of the box 112 in question and the speed of the conveyer 114. Height and speed information is provided by the height-measuring device 128 and the speed-measuring device 138, respectively.

Any suitable height-measuring device 128 could be used. In this embodiment an emitter 130, located on the right side of the conveyor 114 in FIG. 3, is paired with a receiver 132, located on the left side of the conveyor 114. Both the emitter 130 and receiver 132 are located upstream (i.e., opposite the direction of travel) from the camera 110. A controller 134 operates the emitter 130 and receiver 132 and communicated height information to the camera 110.

Similarly, any suitable speed-measuring device 138 could be used. In this embodiment a tachometer is used to measure the speed of the conveyor 114. Speed information is communicated to the camera 110.

As a practical matter, the lens system 116, the height-measuring device 128, and the conveyor 114 all limit the maximum height and width of an object that can be accurately scanned by the camera 110. This area is illustrated in FIG. 3 as the object imaging zone 136.

Image data gathered by the camera 110 is communicated to the host system 140 after the image data has been processed, the details of which are set forth below.

Figure 4:
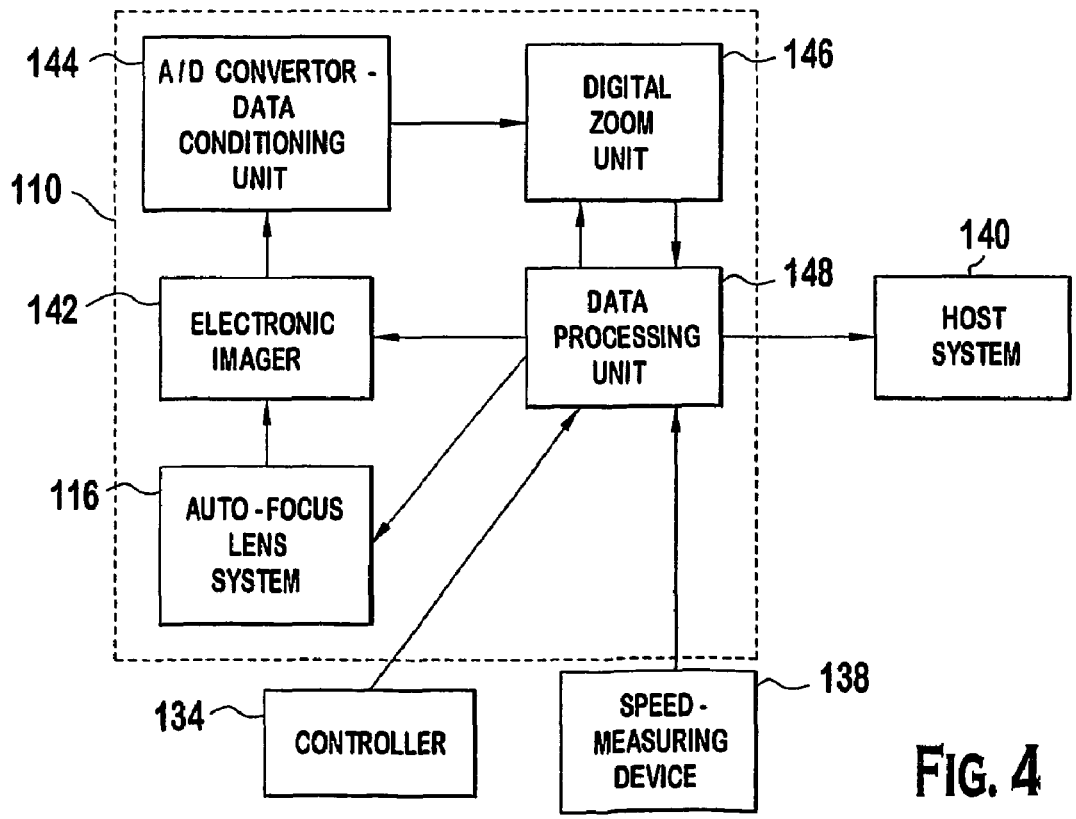
FIG. 4 is a block diagram showing major functional components of the identification system.

FIG. 4 shows the primary functional components of one embodiment of the system 100 and the relationships between each component. Of course, many variations on this structure are possible. It should be noted that the data processing unit 148, digital zoom unit 146, analog-to-digital converter/data conditioning unit 144 are all shown as being internal parts of the camera 110. Obviously, any one or all of these components could be provided separately from the camera 110.

Analog image data (i.e., a scan line) is captured by an electronic imager 142 (also called an optical sensor) through the auto-focus lens system 116. A data processing unit 148 gathers height information from the controller 134 and communicates it to the auto-focus lens system 116 to enable proper focus adjustments. The data processing unit 148 also optionally gathers speed information from the speed-measuring device 138 and communicates it to the electronic imager 142 to enable field of view adjustments, which are explained in greater detail herein.

The analog image data is then converted to clean, digital image data by the analog-to-digital converter/data conditioning unit 144. Focus and height information are provided by the data processing unit 148 to the digital zoom unit 146. The clean, digital image data is then rescaled by the digital zoom unit 146, which results in rescaled digital image data. The digital zoom unit 146 can be any type of controller that includes programmable logic circuit that performs the rescaling function, such as a field programmable gate array.

The rescaled digital image data is then analyzed by the data processing unit 148 to identify bar code, textual, and/or other optical information on the outer surface of the box 112. Such optical information is then passed to the host system 140.

The process for correcting perspective distortion in images captured by the camera 110 of the system 100 will now be discussed in greater detail. A single scan line 18 taken by the camera 110 will have a resolution that is proportional to the distance between the lens 116 and the object being imaged, in this case a box 112. This distance is shown as distance D1 in FIG. 1. Thus a scanned line taken at the upper edge 122 of the box 112 will have a higher resolution than a scanned line taken at a lower edge 120 of the box 112. The equation for determining the resolution at a given distance D1 is as follows:

DPI=1/((Distance/Lens Focal Length−1)*Sensor Pixel Pitch)

where: Distance=D1
Lens Focal Length=Focal Length of the lens of the lens 116
Sensor Pixel Pitch=the distance between the centers of adjacent pixels of the imager 142
(all dimensions must be in inches) For example, at 102.375 inches a 135 mm lens (5.3150 inches) projecting an image onto a CCD sensor with a pixels pitch of 0.0002756 inches, will result in a 198.7 dpi image.

Figure 2:
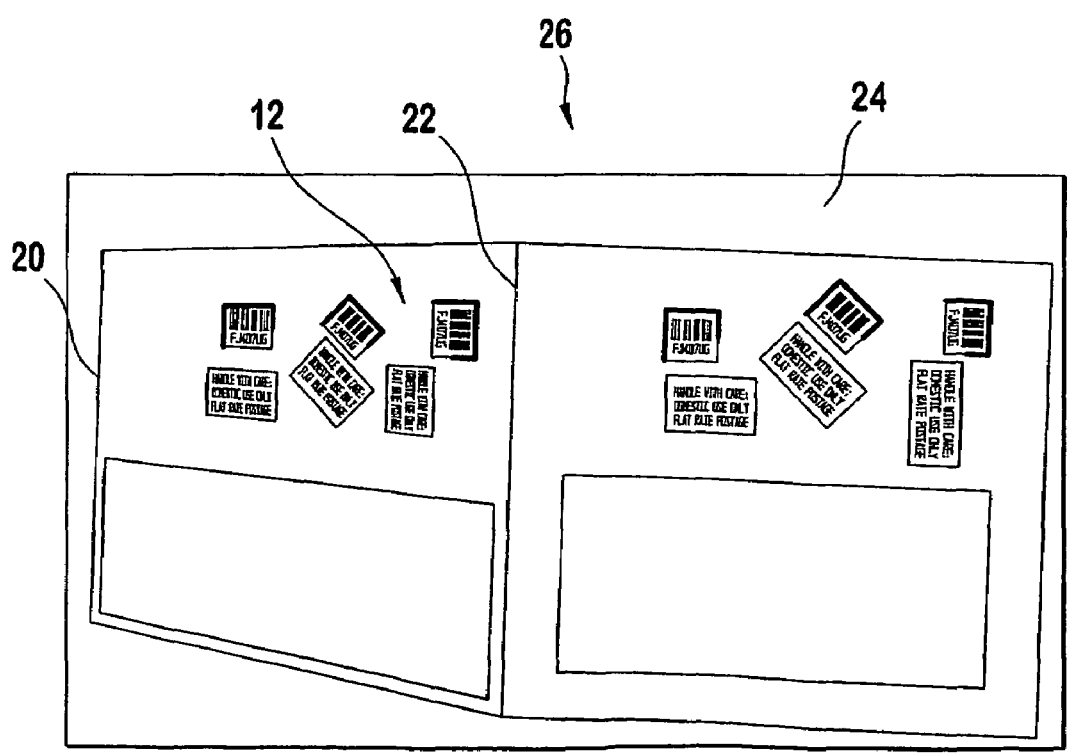
FIG. 2 is an image composed of a series of scan lines taken by the line scanner of the box shown in FIG. 1.

The present invention electronically removes perspective distortion in an image by rescaling each scan line, so that all of the scan lines have the same resolution. In order to rescale an image (for example, image 26 of FIG. 2), it is necessary to reduce the resolution of each scan line to the lowest resolution of any of the scan lines of that particular image. The resolution of each scan line is inversely proportional to the distance D1 between the sensor 10 and the portion of the object being scanned. Thus, the lowest possible ("minimum") resolution of the imager 10 shown in FIG. 1 would occur at the distance D2 which is equal to the distance between the imager 10 and the conveyor belt 14. As a practical matter, no portion of an object moving along the conveyor belt 14 could be further from the imager 10 than the top surface 24 of the belt 14. In accordance with the present invention, each scan line of an image is rescaled to the minimum resolution.

When this algorithm is implemented in hardware external to the camera 110, the resolution for each scan needs to be encoded into the scan line itself along with a target rescale. Typically, the target resolution is fixed to the resolution at the level of conveyor 114. However, there may be instances where the rescale algorithm is not used for perspective correction, but as a noise filter by using a constant rescale factor. This would mean the target resolution would always be some fixed percent less than the current resolution of the scan line. To encode this information into the scan line, the first four pixels of the scan line are replaced with this information. The first two pixels specify the actual resolution of the scan. Since each pixel has an 8 bit value, the resolution then is defined as 16 bits where the first 9 bits represent the whole number portion and the remaining 7 bits represent the fractional portion. Thus these two pixels are used to encode the target resolution using the same 9 bits/7 bits scheme.

Figure 5:
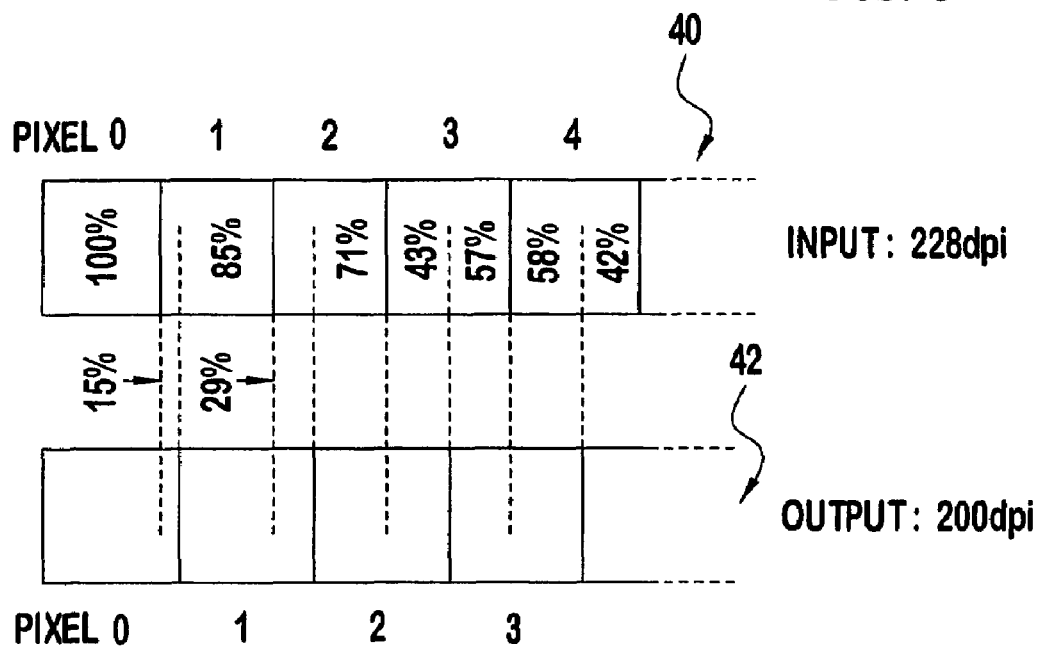
FIG. 5 shows the pixel alignment of portions of two scan lines after rescaling.

FIG. 5 shows a portion of an exemplary scan line 40 having pixels 0 through 4 and being taken at a resolution of 228 dpi. In this case the minimum resolution is equal to 200 dpi and modified scan line 42 shows pixels 0 through 3 of scan line 40 having been rescaled to 200 dpi. The ratio of the original resolution to the rescaled resolution will be referred to herein as a "rescaling factor".

Figure 6:
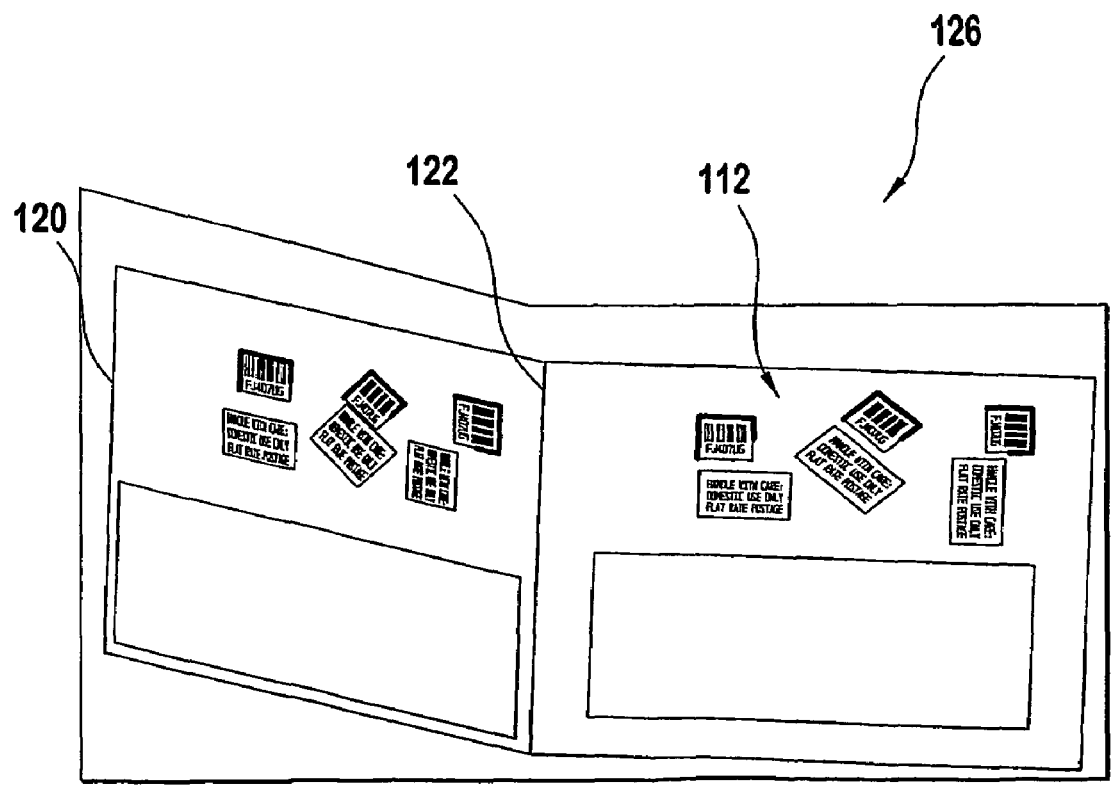
FIG. 6 shows the image of FIG. 2 after rescaling.

FIG. 6 shows an image 126 in which all of the scan lines have been rescaled, as described above. A comparison of the "raw" image 26 of FIG. 2 and the rescaled image 126 of FIG. 6 demonstrates how the method of the present invention removes perspective distortion. The upper front edge 122 of the box 112 appears to be the same width as the lower front edge 120 of the box 112.

One side effect of the rescaling of scan lines to create the rescaled image 126 is that lowering the resolution of a scan line increases the length of the scan line. Thus, if the scan lines of the image are not rescaled equally (i.e., using the same rescaling factor), the image will appear skewed. A different rescaling factor is required whenever the resolution of a scan line is different from the resolution of the preceding scan line. Returning to FIG. 6, it can be seen that this skew is introduced when the resolution of pixels of scan line 40 are reduced which makes each pixel slightly larger. In the example shown in FIG. 5, pixel 1 of modified scan line 42 is skewed 15 percent with respect to pixel 1 of scan line 40. Obviously the wider each scan line is and the larger the rescaling factor is, the more skew is introduced.

Figure 7:
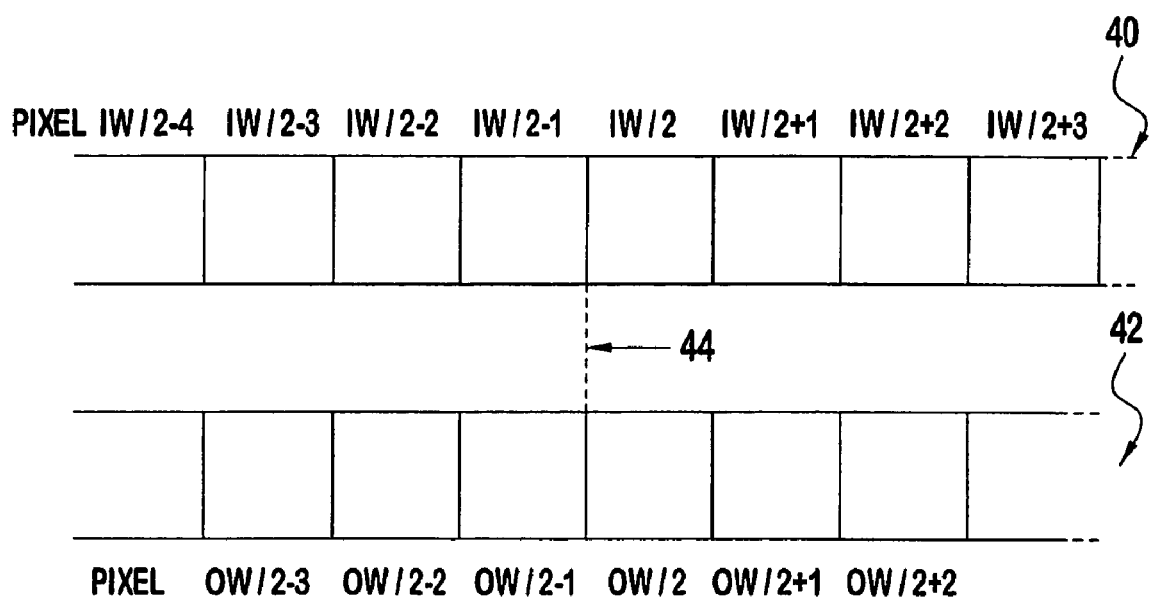
FIG. 7 shows the portions of a scan lines illustrated in FIG. 3, wherein the center of the portions of the are in phase for rescaling.
Figure 8:
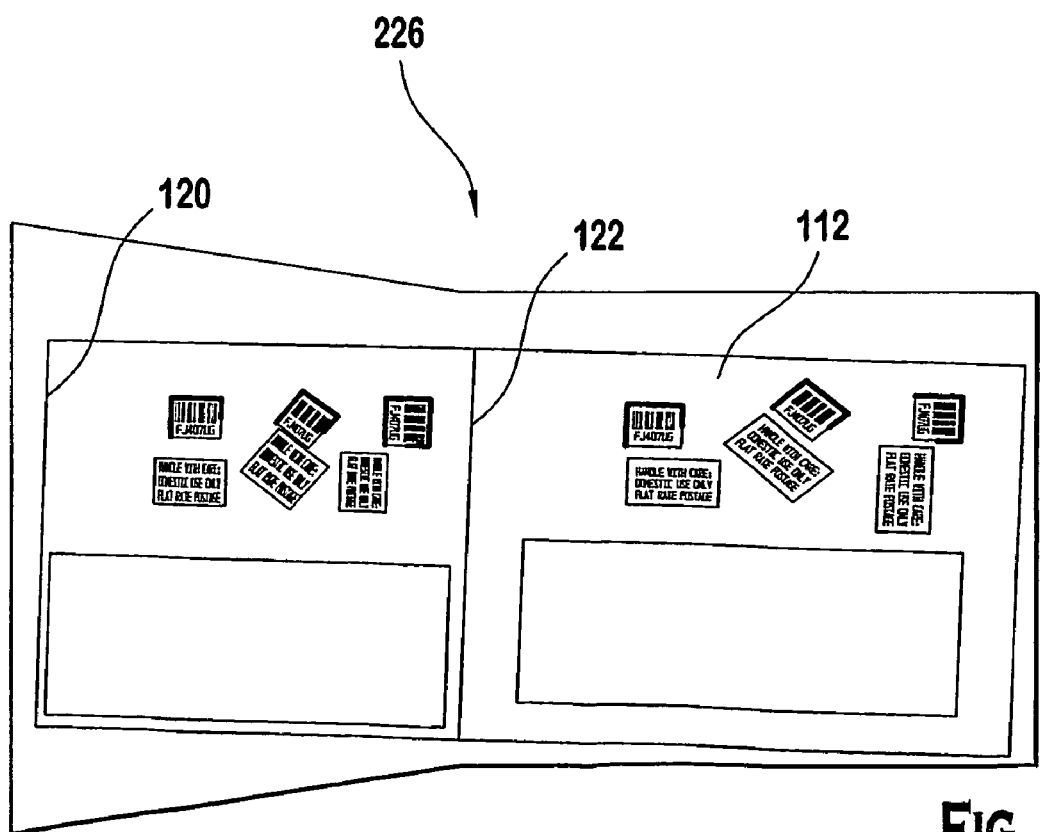
FIG. 8 shows the image of FIG. 4, after the scan lines have been rescaled with the center in phase.

As shown in FIG. 7, such skew is corrected by processing the raw scan line 40 and the output scan line 42 in separate halves. In FIG. 7, IW is equal to the length of the input scan line 40, whereas OW is equal to the length of the input scan 40 multiplied by the rescaling factor. By processing the input scan line 40 and output scan line 42 in separate halves, the center of each scan line can be placed in phase. The result of this process is shown in the image 226 shown in FIG. 8.

Figure 9:
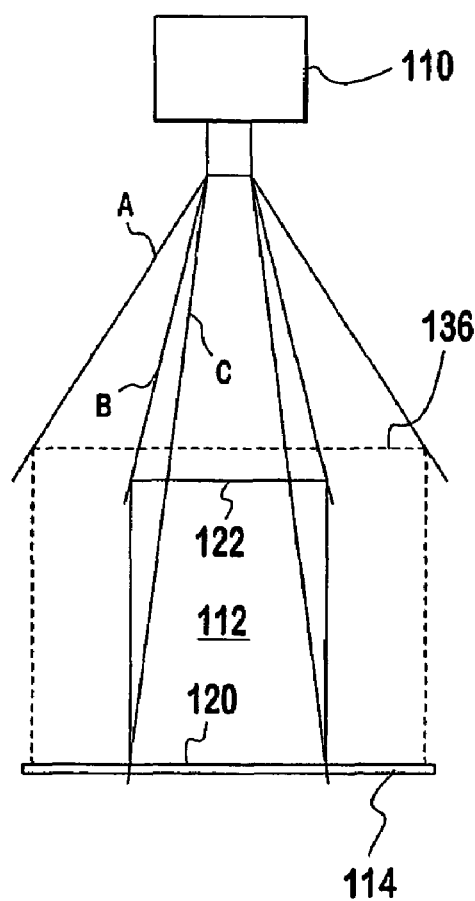
FIG. 9 is a schematic drawing showing the optional step of varying the field of view of the line scanner.
Figure 10:
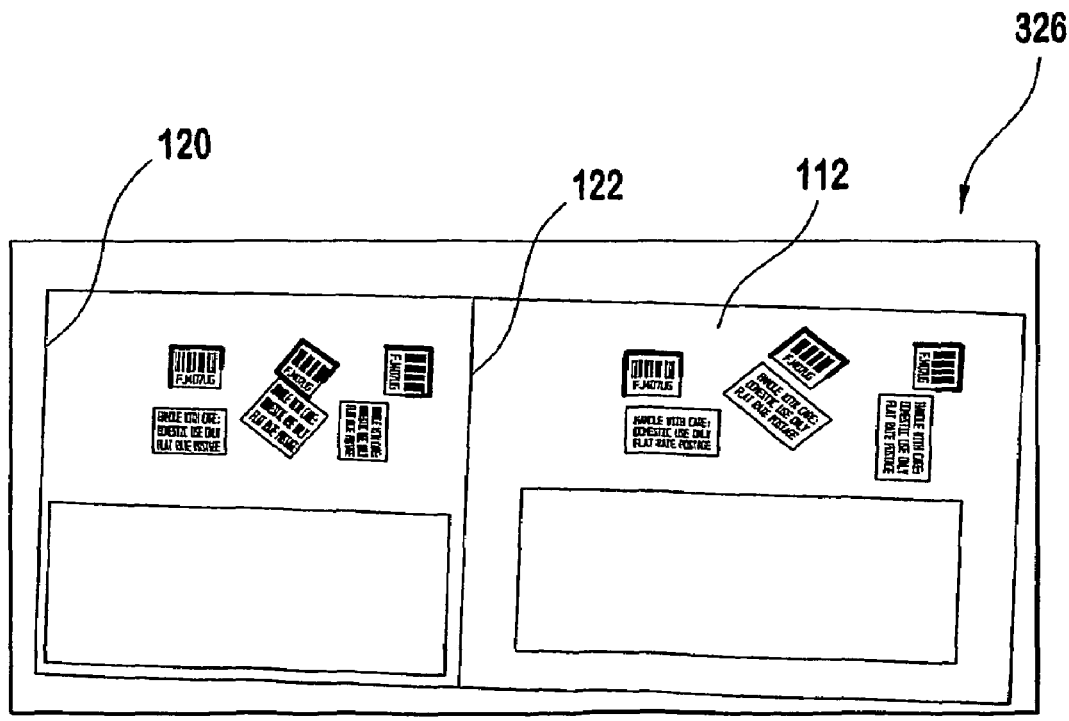
FIG. 10 shows the image of FIG. 8 taken with a line scanner in which the field of view is varied.

FIG. 9 illustrates an optional feature of the present invention. In this embodiment, the electronic imager 142 (see FIG. 4) of the camera 110 is a random access CMOS linear imager, which is used in combination with the height-measurement device 128 to vary the width of each scan line as a function of resolution. As explained above, a portion of the box 112 which is closer to the camera (e.g., the upper edge 122) will have a higher resolution than a portion of an object which is further away from the camera (e.g., the lower edge 120). Therefore, for an electronic imager having fixed number of pixels, a rescaled line of a portion of an object that is closer to the camera 110 will be shorter than a scan line taken of a portion of an object that is further from the camera 110.

In order to compensate for this, the electronic imager 142 (FIG. 4) can be adapted to widen the field of view (FOV) when the portion of the box 112 being imaged is closer to the camera 110. In FIG. 9, FOV A represents the maximum width of FOV of the electronic imager 142. When the upper edge 122 of the box 112 is scanned, a narrower FOV B is required, which corresponds to a smaller portion of the width of the imager 142. When the lower edge 120 of the box 112 is scanned, an even narrower FOV C is required.

Turning to a more concrete example, consider an imager having 8144 pixels and a 24 inch wide conveyor belt where the image resolution at the level of the conveyor belt is 200 dpi. In accordance with the method of the present invention, the FOV would be set to 24 inches, which would correspond to 4800 pixels of the imager at the level of the conveyor belt. For a scan taken above the conveyor belt, at 321 dpi for example, 7704 pixels would be used (24 inches * 321 dpi). The pixels used in each scan are preferably centered on the imager array.

Various other hardware and software solutions could also be utilized to implement the present invention. In addition, the embodiments of the system 100 are described in the context of a top/front-scan application (i.e., an application in which information is captured from the top and front sides of objects). The system 100 could be easily adapted to other applications, such as side-scan applications, for example.

While the embodiments of the invention have been described in detail, the invention is not limited to the specific embodiments described above which should be considered as merely exemplary. Further modifications and extensions of the present invention may be developed, and all such modifications are deemed to be within the scope and spirit of the present invention.

The invention claimed is:

1. A method of correcting an image of an object moving along a transport device having a top surface, the method comprising: scanning at least a portion of the object using a line scanner to create a plurality of scan lines, each of the plurality of scan lines having a resolution; and rescaling each of the plurality of scan lines, so that the resolution of each of the plurality of scan lines is equal to the resolution of every other of the plurality of scan lines.

2. The method of claim 1, wherein the resolution of each of the plurality of scan lines after the rescaling step is less than or equal to the lowest resolution of all of the plurality of scan lines before the rescaling step.

3. The method of claim 1, wherein each of the plurality of scan lines includes a first half, a second half and a center line and the rescaling step further comprises processing the first half of each of the plurality of scan lines separately from the second half of each of the plurality of scan lines.

4. The method of claim 3, further comprising processing the plurality of scan lines after the rescaling step to form a second image in which the center lines of all of the plurality of scan lines are co-linear.

5. The method of claim 1, wherein each of the plurality of scan lines includes a width, the method further comprising setting the width of each of the plurality of scan lines as a function of the resolution of each of the plurality of scan lines prior to the rescaling step, so that the widths of all of the plurality of scan lines are equal after the rescaling step.

6. The method of claim 1, in which the image is captured with an imaging device including a lens having a focal length and a field of view, the method further comprising the steps of:
    (a) determining the distance between the lens and a first portion of the object at a first point in time;
    (b) adjusting the focal length of the imaging device as a function of the distance between the lens and a first portion of the object at the first point in time;
    (c) wherein the scanning of the first portion of the object at the first point in time creates a first scan line of the object or portion thereof comprising an array of pixels and a resolution; and
    (d) the rescaling step further includes electronically rescaling the first scan line so that the resolution is equal to a target resolution.

7. The method of claim 6, wherein the target resolution is equal to the resolution of a scan line taken of the top surface of the transport device.

8. The method of claim 6, wherein the first scan line includes first and second halves, and the method further comprises processing the first half separately from the second half.

9. The method of claim 6, wherein the adjusting step further comprises adjusting the field of view of the lens as a function of the distance between the lens and the first portion of the object at the first point in time.

10. The method of claim 9, wherein the step of adjusting the field of view comprises varying a number of pixels in the array of pixels.

11. The method of claim 6, wherein the determining step further comprises determining a height of the first portion of the object above the top surface of the transport device.

12. The method of claim 11, wherein the determining step further comprises determining the speed at which the object is moving along the transport device.

13. A method for removing perspective distortion from an image of at least a portion of an object moving along a transport device, the image comprising a plurality of scan lines taken by an electronic imaging device, each of the plurality of scan lines having a resolution and the electronic imaging device including an optical sensor, a lens having a nodal plane, a focal length, and a pixel pitch, the method comprising: determining a target resolution, wherein the target resolution is less than or equal to $1/((D1/LFL-1)*SPS)$ where: D1=the distance between the nodal plane of the lens and the transport device LFL=the focal length of the optical sensor SPS=the pixel pitch of the optical sensor; and rescaling each of the plurality of scan lines so that the resolution of each of the plurality of scan lines is equal to the target resolution.

14. A system for capturing perspective-corrected images of an object moving along a transport device comprising: a line scanner having a focal length and a field of view, the line scanner being adapted to capture a plurality of scan lines, each of the plurality of scan lines having a resolution; and a controller that determines a target resolution that is less than or equal to the lowest resolution of any of the plurality of scan lines and rescales each of the plurality of scan lines so that the resolution of each of the plurality of scan lines is equal to the target resolution.

15. The system of claim 14, further comprising a first device that determines the height of a portion of the object.

16. The system of claim 15, further comprising a second device that determines the speed at which the object is moving along the transport device.

* * * * *